(12) United States Patent
Watashiba

(10) Patent No.: US 7,059,962 B2
(45) Date of Patent: Jun. 13, 2006

(54) GUN SHOOTING GAME DEVICE, METHOD OF CONTROLLING COMPUTER AND PROGRAM

(75) Inventor: Yu Watashiba, Tokyo (JP)

(73) Assignees: Konami Corporation, Tokyo (JP); Konami Computer Entertainment Tokyo, Inc., Tokyo (JP)

( * ) Notice: Subject to any disclaimer, the term of this patent is extended or adjusted under 35 U.S.C. 154(b) by 602 days.

(21) Appl. No.: 10/197,893

(22) Filed: Jul. 19, 2002

(65) Prior Publication Data

US 2003/0032466 A1 Feb. 13, 2003

(30) Foreign Application Priority Data

Aug. 10, 2001 (JP) ............................ 2001-243945

(51) Int. Cl.
*A63F 13/00* (2006.01)

(52) U.S. Cl. ......................................................... 463/2

(58) Field of Classification Search ............ 463/51–57, 463/2, 49
See application file for complete search history.

(56) References Cited

U.S. PATENT DOCUMENTS

| 4,588,187 A | 5/1986 | Dell |
| 6,283,861 B1 * | 9/2001 | Kawai et al. ................. 463/43 |

FOREIGN PATENT DOCUMENTS

| JP | 11-259687 A | 9/1999 |
| WO | WO 96/25989 A | 8/1996 |
| WO | WO 00/59594 A | 10/2000 |

* cited by examiner

*Primary Examiner*—Kim Nguyen
(74) *Attorney, Agent, or Firm*—Sughrue Mion, PLLC

(57) ABSTRACT

In providing a gun shooting game allowing selective use of one or more types of controller among multiple types of controller, the effect of difference between controllers on the game can be diminished. A gun shooting game device 10 allowing selective use of one or more types of controller among multiple types of controller includes a target display unit 100 for displaying a target, a controller type determination unit 102 for determining the type of a currently used controller, a hit determination unit 103 for determining whether or not a bullet has hit the target based on data supplied by the controller, and a range extent control unit 104 for controlling the extent of a range in which the bullet is determined as hitting the target among supplied data based on the controller type.

6 Claims, 12 Drawing Sheets

GUN SHOOTING GAME DEVICE, METHOD OF CONTROLLING COMPUTER AND PROGRAM

BACKGROUND OF THE INVENTION

The present invention relates to a gun shooting game device, a method of controlling a computer, and a program. The present invention more particularly relates to a technique for implementing a gun shooting game which allows players to use one or more types of controller selectively among multiple types of controller.

Gun shooting game devices are designed to display a target on a game screen and cause a bullet to hit the target as a result of a player's designation made by entering a firing direction of the bullet with a controller. Such gun shooting game devices have been widely popular because they allow players to virtually experience shooting a real gun.

While controllers in the shape of a pistol or a rifle, i.e. so-called gun controllers, are often used for gun shooting game devices, other types of controller are sometimes used in view of the cost and the like. When, for example, a gun shooting game program is executed in a home-use game machine to implement a gun shooting game device, it is desirable that all-purpose controllers prepackaged with the home-use game machine can also be used in addition to such gun controllers.

However, the type of controller used for the gun shooting game significantly affects the game because players are required to play the game with high speed and accuracy with respect to the shooting operation. Therefore, when players play a conventional gun shooting game device with multiple types of controller, they may not fully enjoy the game depending on the controller type.

SUMMARY OF THE INVENTION

The present invention has been conceived in view of the above-described problems, and an object thereof is to provide a gun shooting game device, a method of controlling a computer, and a program, capable of diminishing the effect of difference between controllers on a gun shooting game in which one or more types of controller can be selectively used among multiple types of controller.

In order to solve the above problems, a gun shooting game device according to one aspect of the present invention is a gun shooting game device allowing selective use of one or more types of controller among multiple types of controller, comprising target display means for displaying a target, type determination means for determining a type of a currently used controller, hit determination means for determining whether or not a bullet has hit the target based on data supplied by the currently used controller, and range extent control means for controlling an extent of a range of data supplied by the controller where the bullet is determined as hitting the target based on the type of currently used controller.

A method of controlling a computer (such as a personal computer and a home-use or arcade game machine) according to another aspect of the present invention is a method of controlling a computer allowing selective use of one or more types of controller among multiple types of controller, comprising a target display step for displaying a target, a type determination step for determining a type of a currently used controller, a hit determination step for determining whether or not a bullet has hit the target based on data supplied by the currently used controller, and a range extent control step for controlling an extent of a range of data supplied by the controller where the bullet is determined as hitting the target based on the type of the currently used controller.

A program according to a further aspect of the present invention is a program for causing a computer (such as a personal computer and a home-use or arcade game machine) to function as a gun shooting game device allowing selective use of one or more types of controller among multiple types of controller, and the program causing the computer to function as target display means for displaying a target, type determination means for determining a type of a currently used controller, hit determination means for determining whether or not a bullet has hit the target based on data supplied by the currently used controller, and range extent control means for controlling an extent of a range of data supplied by the controller where the bullet is determined as hitting the target based on the type of the currently used controller.

According to the present invention, one or more types of controller can be selectively used among multiple types of controller, and the type of the controller actually being used is determined. Based on data supplied by the controller, determination is made as to whether or not a bullet has hit a displayed target. For this operation, the extent of a range of data supplied by the controller where a bullet is determined as hitting the target is controlled based on the type of the actually used controller. For example, when a bullet is determined immediately or subsequently as hitting the target if the data supplied by the controller belongs to a certain range, the extent of the range is decided in accordance with the type of the actually used controller. Thus, the effect of difference between controllers on the game can be diminished.

According to one embodiment of the present invention, the range extent control means includes trajectory information calculation means for calculating trajectory information on the bullet based on the data supplied from the currently used controller, trajectory information correction means for correcting the trajectory information based on a position of the target, and correction amount control means for controlling an amount of correction made by the trajectory information correction means based on the type of the currently used controller.

In this embodiment, the trajectory information is calculated based on the data supplied from the actually used controller. The trajectory information is information related to a trajectory, such as information indicating a firing direction of a bullet. The trajectory information is corrected based on the position of the target. For such correction, an amount of correction is controlled based on the type of the actually used controller. As a result, it is made possible to correct the trajectory toward the target depending on the controller type, thereby diminishing the effect of difference between controllers on the game.

According to another embodiment of the present invention, the hit determination means determines whether or not the bullet has hit the target based also on a positional relationship between the bullet and an invisible, i.e. undisplayed, hit area moved in accordance with the target, and the range extent control means controls the extent of the hit area based on the type of the currently used controller.

In this embodiment, the hit area is moved in accordance with the target. The hit area is different from the target and not displayed. Determination is then made as to whether or not the bullet has hit the target based on the positional relationship between the hit area and the bullet. For this determination, the extent of the hit area is decided based on the type of the controller actually used. As a result, the hit area can be increased or decreased depending on the controller type, thereby making it easy or difficult to hit the target with a bullet and therefore diminishing the effect of difference between controllers on the game.

DESCRIPTION OF THE PREFERRED EMBODIMENTS

The entire disclosure of the corresponding Japanese application 2001-243945 filed on Aug. 10, 2001 including specification, claims, drawings and summary, is incorporated herein by reference.

Exemplary embodiments of. the present invention will now be described in detail with reference to the drawings.

Figure 1:
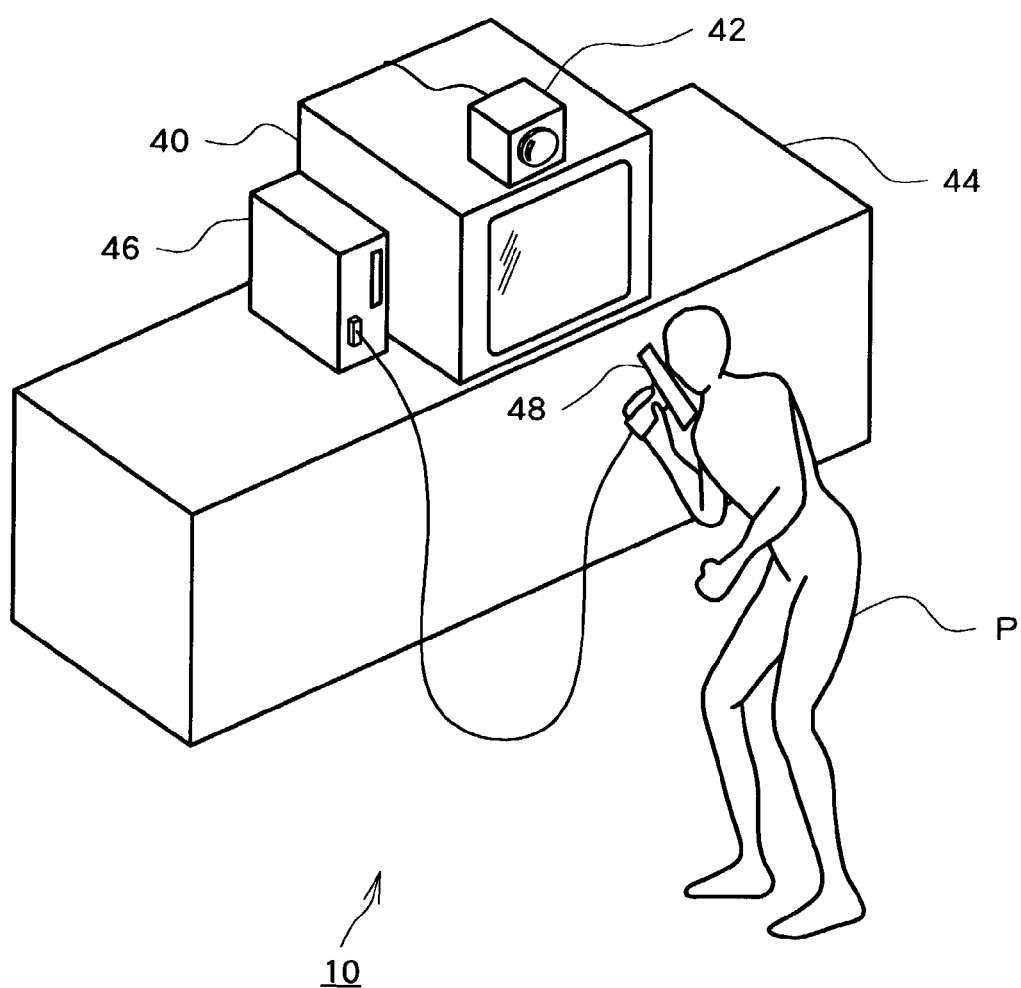
FIG. 1 illustrates a player enjoying a gun shooting game using a gun shooting game device according to an embodiment of the present invention.

FIG. 1 is a perspective view for expressing a situation where a player plays a game using a gun shooting game device according to one embodiment of the present invention. As illustrated in FIG. 1, the gun shooting game device 10, which includes a home-use TV receiver 40, a camera unit 42, and a home-use game machine 46, is used for providing a player with a gun shooting game. While a gun controller 48 is used for playing the gun shooting game in the description below, the gun shooting game device 10 is designed to allow a player to play the game with other controllers as well (such as a mouse and an all-purpose game controller).

As illustrated in FIG. 1, the home-use TV receiver 40 and the home-use game machine 46 are mounted on a cabinet 44, while the camera unit 42 is on the home-use TV receiver 40. The camera unit 42 is a digital camera for presenting an image of a player P in real time, and connected to the home-use game machine 46 via a cable (such as a USB (universal serial bus) cable) for supplying the captured player image to the game machine 46 in real time. The home-use game machine 46 is connected to the home-use TV receiver 40, so that game screen images produced by the game machine 46 are displayed while providing game music or game effect sound. The gun controller 48 is a game controller in the form of a gun, and connected to a controller connection terminal of the home-use game machine 46 via a controller cable. When the player P holds the gun controller 48 in his/her hand and aims it at the home-use TV receiver 40, the direction of its gun barrel (specifically, the pointed position on the screen of the home-use TV receiver 40) is input to the home-use game machine 46. The gun controller 48 is provided with a trigger, whose condition (i.e. whether or not the trigger is pulled) is supplied to the home-use game machine 46.

In the home-use game machine 46, a three-dimensional game space (virtual three-dimensional space) is constructed in a memory (a main memory 26 illustrated in FIG. 4), and how the three-dimensional game space is viewed from a viewpoint disposed at a predetermined spatial position is displayed on the TV receiver 40. At this time, in the home-use game machine 46, the position of the head of the player P is recognized from the player image, and the position of the viewpoint moves with the head position. As a result, when the player P moves his/her body in front of the camera unit 42, the game screen image displayed on the home-use TV receiver 40 is changed in accordance with the movement, so that the player P can feel as if he/she entered the three-dimensional game space. Thus, the home-use game machine 46 implements a game in which the player P shoots an enemy game character appearing in the three-dimensional game space with the gun controller 48, and avoids attacks (shooting) from the enemy game character by moving his/her body (specifically, the head position).

Figure 2A:
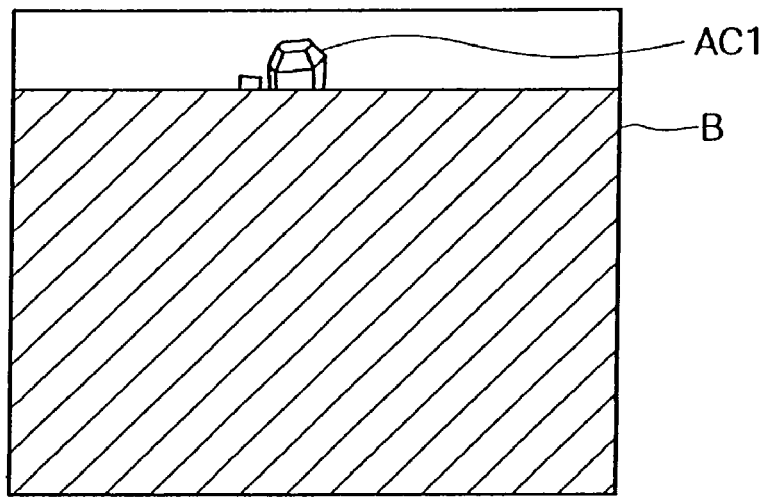
FIGS. 2A–2D are views for explaining an exemplary game screen presented when the player moves vertically.
Figure 2B:
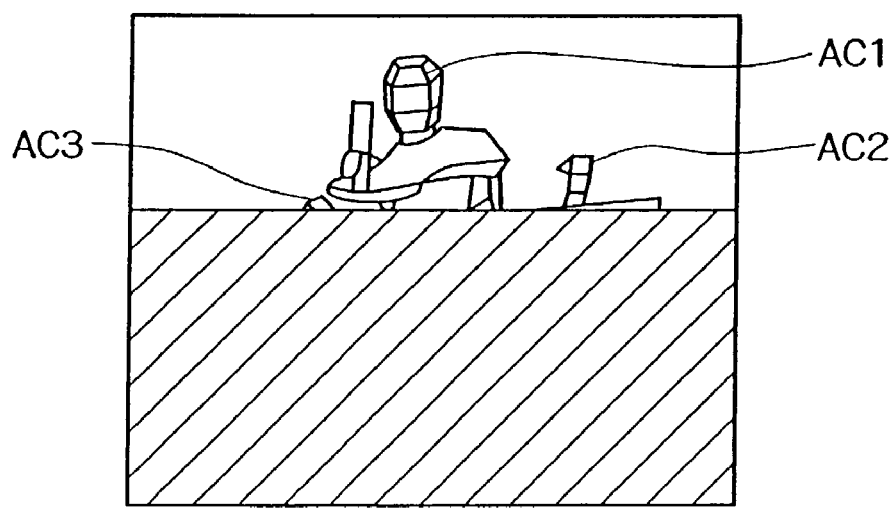
Figure 2C:
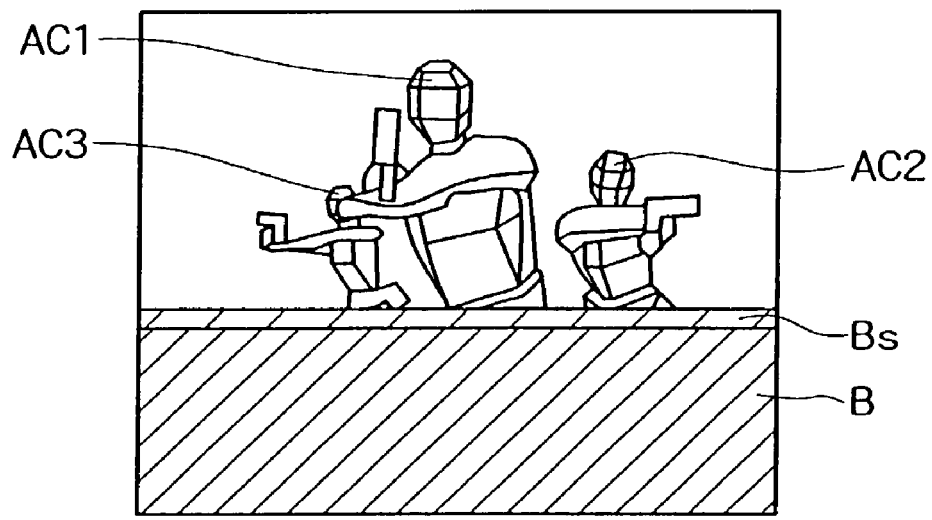
Figure 2D:
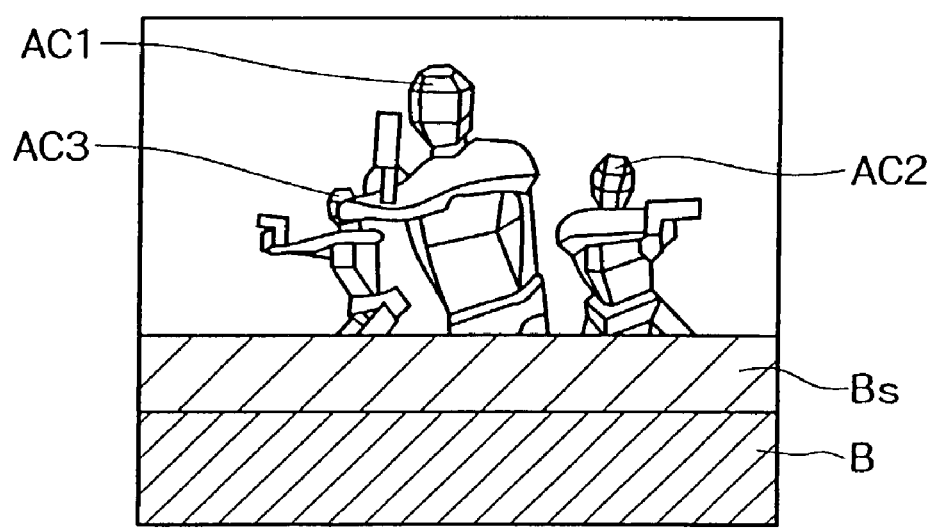

FIGS. 2A–2D illustrate an example of a series of game screens presented on the home-use TV receiver 40 when the head of the player P moves in the vertical direction. The figures show four screen images in the displayed order when the player P gradually rises from a half-sitting posture to a substantially erect posture in front of the camera unit 42, i.e. when the head of the player P is raised from a lower position to a higher position. The game screen in FIG. 2A includes a desk-shaped obstacle B immediately in front of the viewpoint, indicating that the player P is hiding in front of and below the obstacle B. In this situation, only part of the head of an enemy game character AC1 located beyond the obstacle B and holding a gun in his hand is displayed on the game screen. The game screen in FIG. 2B represents the situation where the player P raises his/her head a little so that the head is positioned substantially flush with the upper surface of the obstacle B. In such a situation, the enemy game character AC1 is displayed up to the chest thereof on the game screen, and the heads of two more enemy game characters AC2 and AC3 are additionally displayed behind the character AC1. The game screen illustrated in FIG. 2C indicates the situation where the player P further stretches his/her back to raise his/her head. In such a situation, the head of the player P is located slightly higher than the upper surface Bs of the obstacle, and upper bodies of the three enemy characters AC1–AC3 and the upper surface Bs of the obstacle are displayed. The game screen illustrated in FIG. 2D indicates the situation where the player P is in a substantially erect posture. In this situation, the player is exposed approximately up to the neck from the obstacle B, and the upper surface Bs of the obstacle is displayed more widely than that in the game screen of FIG. 2C. As illustrated in these figures, as the player's head is raised, the position where the obstacle B is displayed moves downward, and the upper surface Bs of the obstacle and the enemy game characters AC1–AC3 are gradually displayed on the game screen to reveal the whole images thereof.

Figure 3A:
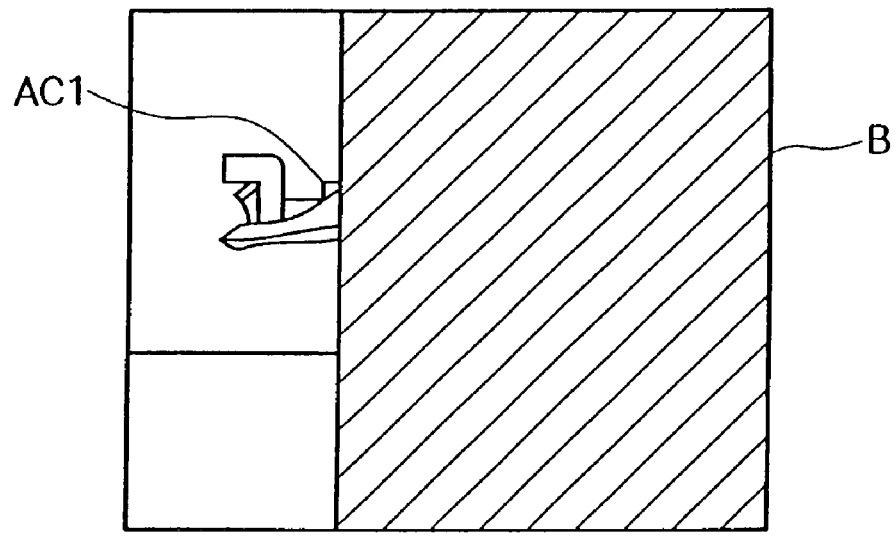
FIGS. 3A–3D are views for explaining an exemplary game screen presented when the player moves horizontally.
Figure 3B:
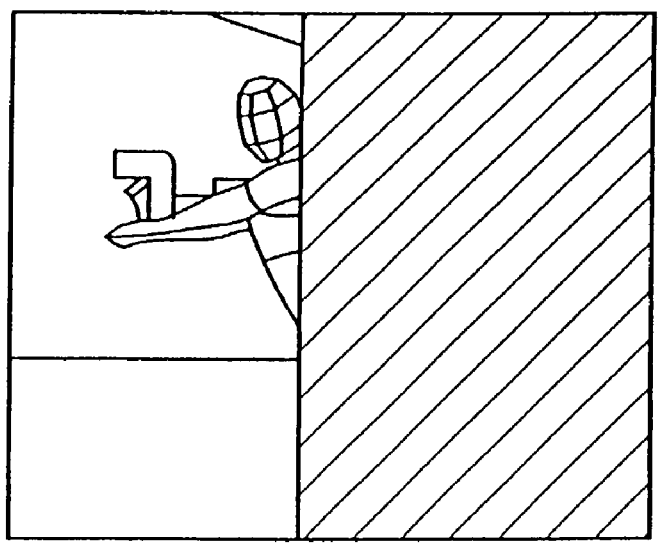
Figure 3C:
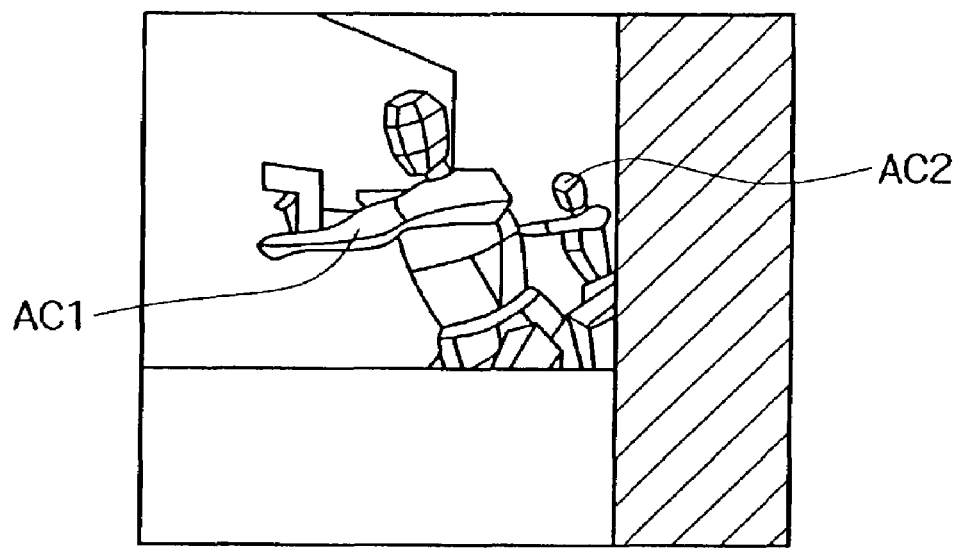
Figure 3D:
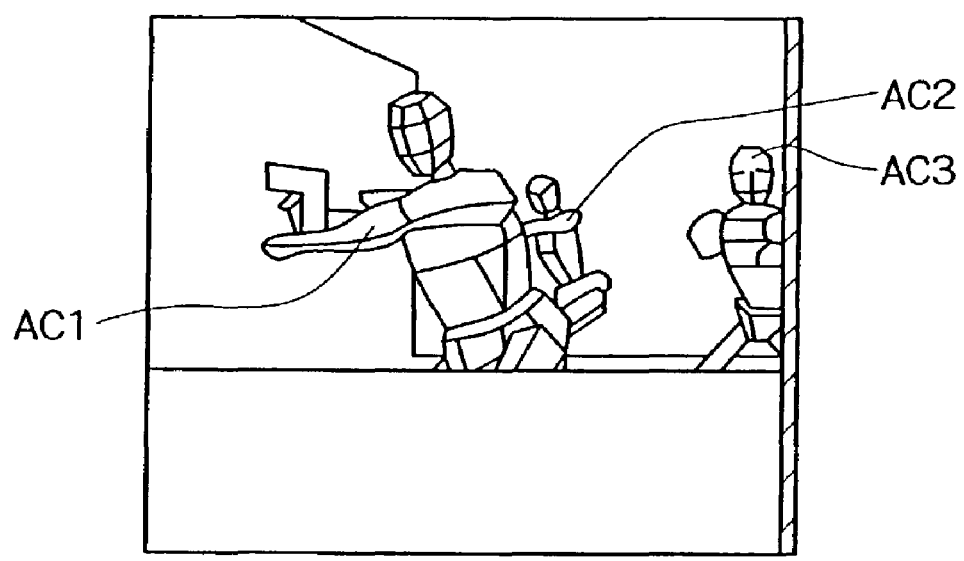

FIGS. 3A–3D illustrate an example of a series of game screens presented on the home-use TV receiver 40 when the head of the player P moves sideways. FIGS. 3A–3D show four screen images in the displayed order when the player P moves his/her body from right to left in front of the camera unit 42, i.e. the head of the player P moves from right to left. The game screen in FIG. 3A includes the obstacle B in the form of a door or a wall located on the right and immediately in front of the viewpoint, indicating the situation where the player P is hiding in front of the obstacle B. In such a situation, only part of an arm of the enemy game character AC1 located beyond the obstacle B and holding a gun in his hand is displayed on the game screen. The game screen in FIG. 3B represents the situation where the player P moves slightly to the left so that his/her head is substantially flush with the left edge of the obstacle B, showing up to the head and chest of the enemy game character AC1. The game screen in FIG. 3C represents the situation where the player P moves further to the left, showing substantially the upper half of the enemy game character AC1 and the enemy game character AC2 behind the character AC1. The game screen in FIG. 3D represents the situation where the player P comes out from the obstacle B to the left. In this situation, the enemy game character AC3 is also displayed in addition to the enemy game characters AC1 and AC2. As illustrated in these figures, as the player's head moves from left to right, the displayed position of the obstacle B moves rightward and the enemy game characters AC1–AC3 gradually appear on the game screen to reveal the whole images thereof.

Figure 4:
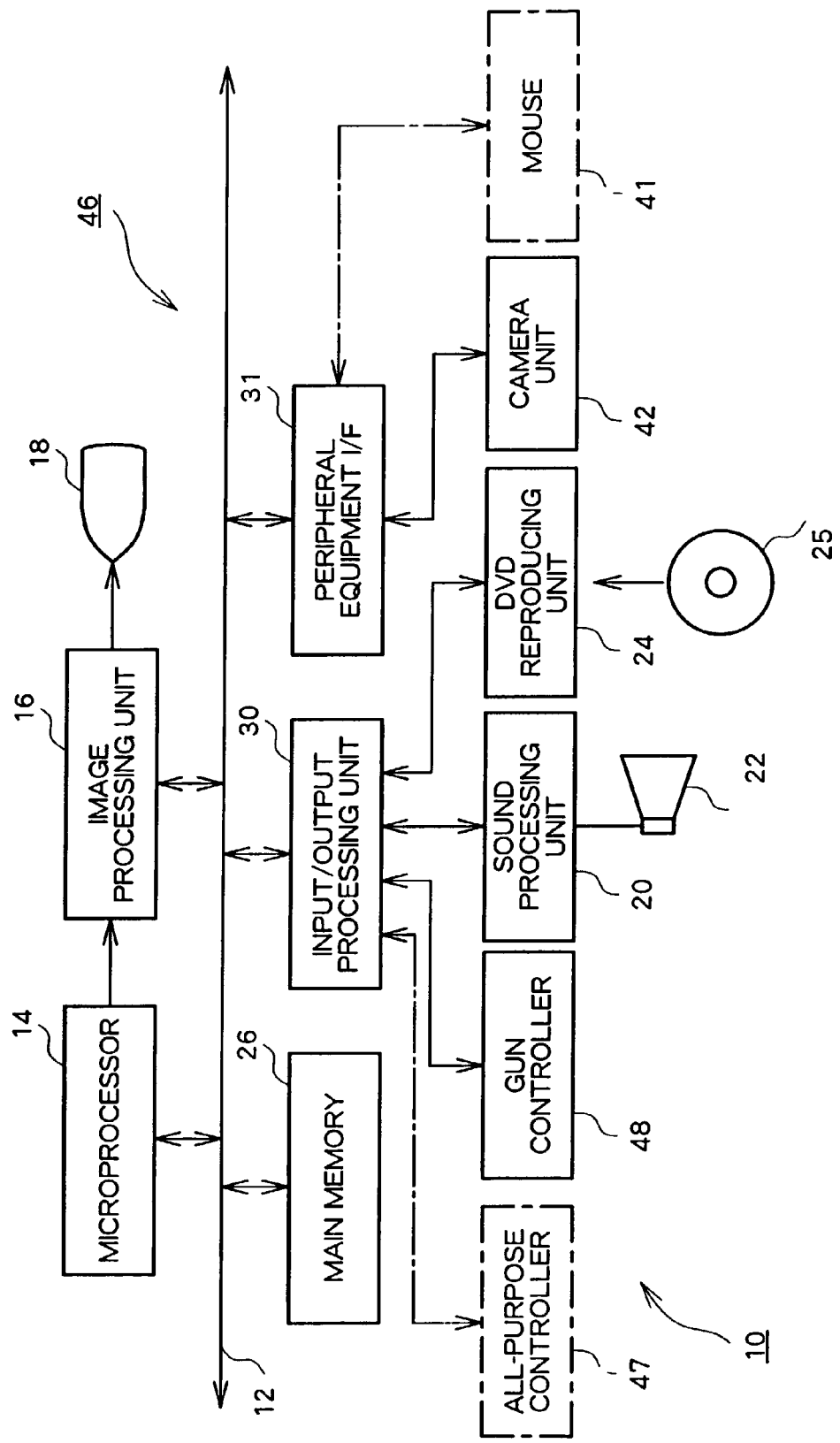
FIG. 4 is a diagram illustrating a hardware configuration of the game device.

FIG. 4 illustrates a hardware configuration of the gun shooting game device 10. As illustrated, the gun shooting game device 10 is formed by a DVD™ (digital versatile disk) 25, which is an information storage medium, placed in the home-use game machine 46 connected to the monitor 18 and the speaker 22. While the DVD 25 is used for supplying a game program and game data to the home-use game machine 46 in this embodiment, any other information storage medium, such as CD-ROMs (compact disk-read only memory) and ROM (read only memory) cards, may be used instead. The game program and the game data can be remotely supplied to the home-use game machine 46 through a data network such as the Internet.

The home-use game machine 46 includes a microprocessor 14, an image processing unit 16, the main memory 26, and an input/output processing unit 30, a peripheral equipment interface 31, a sound processing unit 20, and a DVD reproducing unit 24. The microprocessor 14, the image processing unit 16, the main memory 26, the input/output processing unit 30, and the peripheral equipment interface 31 are mutually connected via a bus 12 for data exchange, with the input/output processing unit 30 being further connected to the gun controller 48, the sound processing unit 20, and the DVD reproducing unit 24. The gun controller 48 is detachably connected to the input/output processing unit 30, to which the all-purpose controller 47 is also connected. The peripheral equipment interface 31 is connected to the camera unit 42. The camera unit 42 is also detachably connected to the peripheral equipment interface 31, to which the mouse 41 is also connected. The respective elements of the home-use game machine 46 are all accommodated in a housing. In this embodiment, the home-use TV receiver 40 is used as the monitor 18, and a speaker incorporated therein is used as the speaker 22.

The microprocessor 14 controls the respective elements of the home-use game machine 46 based on an operating system stored in an unillustrated ROM and the game program read from the DVD 25. The bus 12 is used for exchanging addresses and data among the respective elements of the home-use game machine 46. The main memory 26 formed by a RAM (random access memory) is used for storing the game program and game data read from the DVD 25 as required. The main memory 26 is also used as a working area for a variety of operations. The image processing unit 16, which includes a VRAM (video random access memory), receives image data from the microprocessor 14, and draws a game screen image in the VRAM. The image processing unit 16, moreover, converts the content of the VRAM into a video signal provided to the monitor 18.

The input/output processing unit 30 is an interface for relaying data communication between the microprocessor 14 and the all-purpose controller 47, the gun controller 48, the sound processing unit 20, and the DVD reproducing unit 24.

Figure 5:
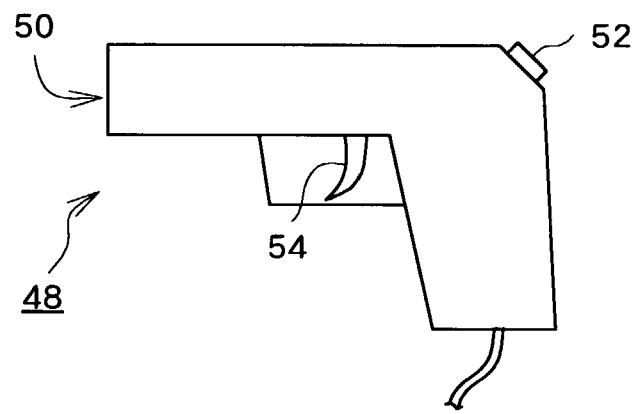
FIG. 5 is a side view illustrating a gun controller.

The gun controller 48 is a game controller in the form of a gun, as illustrated in FIG. 5, used for providing the home-use game machine 46 with the state of a trigger 54 and a button 52, and the direction of the gun barrel or muzzle (specifically, the pointed position on the screen of the home-use TV receiver 40). The gun controller 48 can be of, for example, a well-known structure. More specifically, the gun controller 48 is designed so that, when the player P pulls the trigger 54 of the gun controller 48, such information (trigger signal) is supplied from a controller terminal to the home-use game machine 46. When the home-use game machine 46 receives the trigger signal, an illuminating spot is scanned on the screen of the home-use TV receiver 40 by causing the game program to, for example, present a white screen for a single frame. The gun controller 48 is designed to include a light-receiving sensor with strong directivity at the back of the gun muzzle 50, so that, when the illuminating spot on the home-use TV receiver 40 is detected by the light-receiving sensor, the time period between the start of scan and the detection of the illuminating spot is calculated, thereby obtaining the position (coordinates) of the spot on the screen of the TV receiver 40 from the time period thus calculated. The position, i.e. the direction of the gun barrel (firing direction of a bullet), is supplied to the home-use game machine 46. The time when scanning is started can be preferably obtained from a synchronous signal included in a video signal which is supplied from the home-use game machine 46 to the home-use TV receiver 40.

The gun controller 48 is provided with the button 52 on top of a grip. The button 52 is provided at such a position that a player can press it with his/her thumb while holding the grip of the gun controller 48. When the camera unit 42 is not connected to the home-use game machine 46, depression of the button 52 causes the viewpoint in the three-dimensional game space to move in order to avoid attacks from the enemy game character. Stopping depression of the button 52 causes automatic return to the original attacking position.

Figure 6:
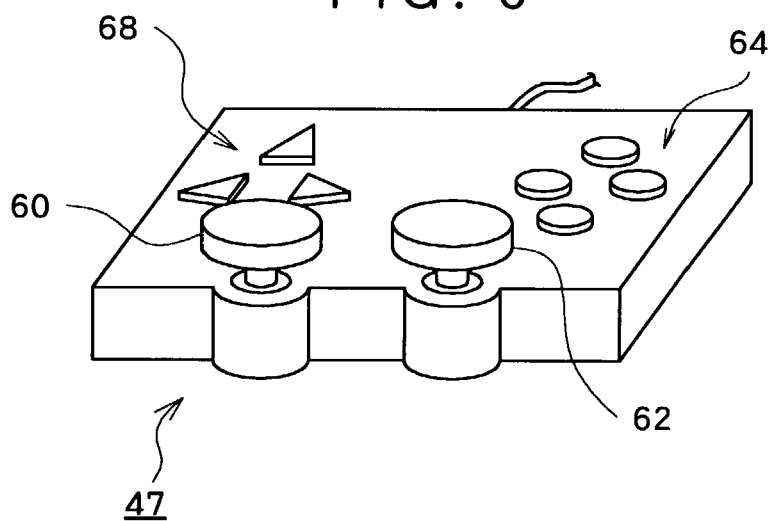
FIG. 6 is a perspective view illustrating an all-purpose controller.

The all-purpose controller 47 is a game operation input device, such as a device prepackaged with the home-use game machine 46, designed for use with many types of games. As illustrated in FIG. 6, the all-purpose controller 47 is specially provided with a left analog joystick 60 and a right analog joystick 62. The all-purpose controller 47 is connected to the home-use game machine 46 via a controller cable, and provided with a group of direction buttons 68 and the left analog joystick 60 on the left side of an upper surface, and a group of buttons 64 and the right analog joystick 62 on the right side thereof. When a player holds the housing of the controller 47 by the right and left ends with both hands, the left thumb is positioned at the group of direction buttons 68 or the head of the left analog joystick 60 and the right thumb is positioned at the group of buttons 64 or the head of the right analog joystick 62.

The left analog joystick 60 and the right analog joystick 62 are provided on the housing of the all-purpose controller 47 protruding therefrom, and can be tilted in all directions, through 360 degrees. When the left analog joystick 60 is tilted, inclinations in vertical and horizontal directions are supplied to the home-use game machine 46 as values ranging respectively from −128 to +128. The same applies to the right analog joystick 62. Thus, the home-use game machine 46 is able to know the current inclination state (orientation) of the right and left analog joysticks 62 and 60.

In this gun shooting game device 10, a cursor (corresponding to the firing direction of a bullet) displayed on the game screen is moved by tilting the left analog joystick 60, and a bullet is fired in the direction corresponding to the cursor position at that moment by depressing any of the group of buttons 68. When the camera unit 42 is not connected to the home-use game machine 46, the viewpoint in the three-dimensional game space is moved vertically and horizontally by tilting the right analog joystick 62, making it possible to avoid attacks from the enemy game character.

Referring back to FIG. 4, the sound processing unit 20, which includes a sound buffer, reproduces data, such as music and game effect sound read by the DVD 25 and stored in the sound buffer, and outputs the data from the speaker 22. The DVD reproducing unit 24 reads the game program and game data recorded in the DVD 25 in accordance with an instruction from the microprocessor 14. The peripheral equipment interface 31 is an interface for connecting a variety of peripheral device to the home-use game machine 46, and can be formed by a USB interface or the like. In this embodiment, the camera unit 42 and the mouse 41 are connected to the peripheral equipment interface 31. The camera unit 42 is, for example, a well-known digital camera for supplying a captured grayscale image (256 levels of gray) to the home-use game machine 46 at predetermined time intervals (such as 1/60 seconds). In order to capture the image of the player P, the camera unit 42 is mounted on the home-use TV receiver 40 with its lens facing the player P in this embodiment.

Figure 7:
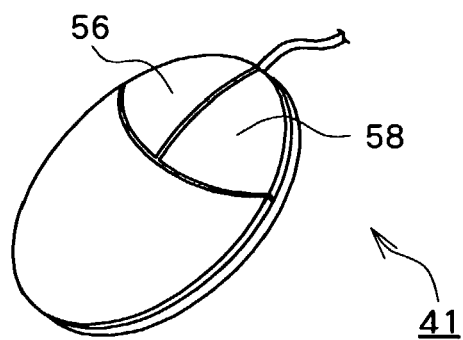
FIG. 7 is a perspective view illustrating a mouse.

The mouse 41 is a well-known device for inputting coordinates, and connected to the home-use game machine 46 via, for example, a USB cable. As illustrated in FIG. 7, the mouse 41 is provided with a left button 56 and a right button 58, and the state of these buttons (i.e. whether they are depressed or not) can be supplied to the home-use game machine 46. On a bottom surface (not shown) of the mouse 41, a mouse ball is rotatably supported, and the rolling amount thereof in the vertical and horizontal directions is supplied to the home-use game machine 46. In this particular embodiment, the cursor (corresponding to the firing direction of the bullet) displayed on the game screen is moved in accordance with the rolling amount of the track ball in the vertical and horizontal directions. When the left button 56 is depressed (clicked), a bullet is fired in the direction corresponding to the cursor position at that moment. When the camera unit 42 is not connected to the home-use game machine 46, depression (click) of the right button 58 causes the viewpoint in the three-dimensional game space to move, thereby allowing the player to avoid attacks from the enemy game character. The viewpoint can be automatically returned to the original attacking position by stopping depression of the right button 58.

Figure 8:
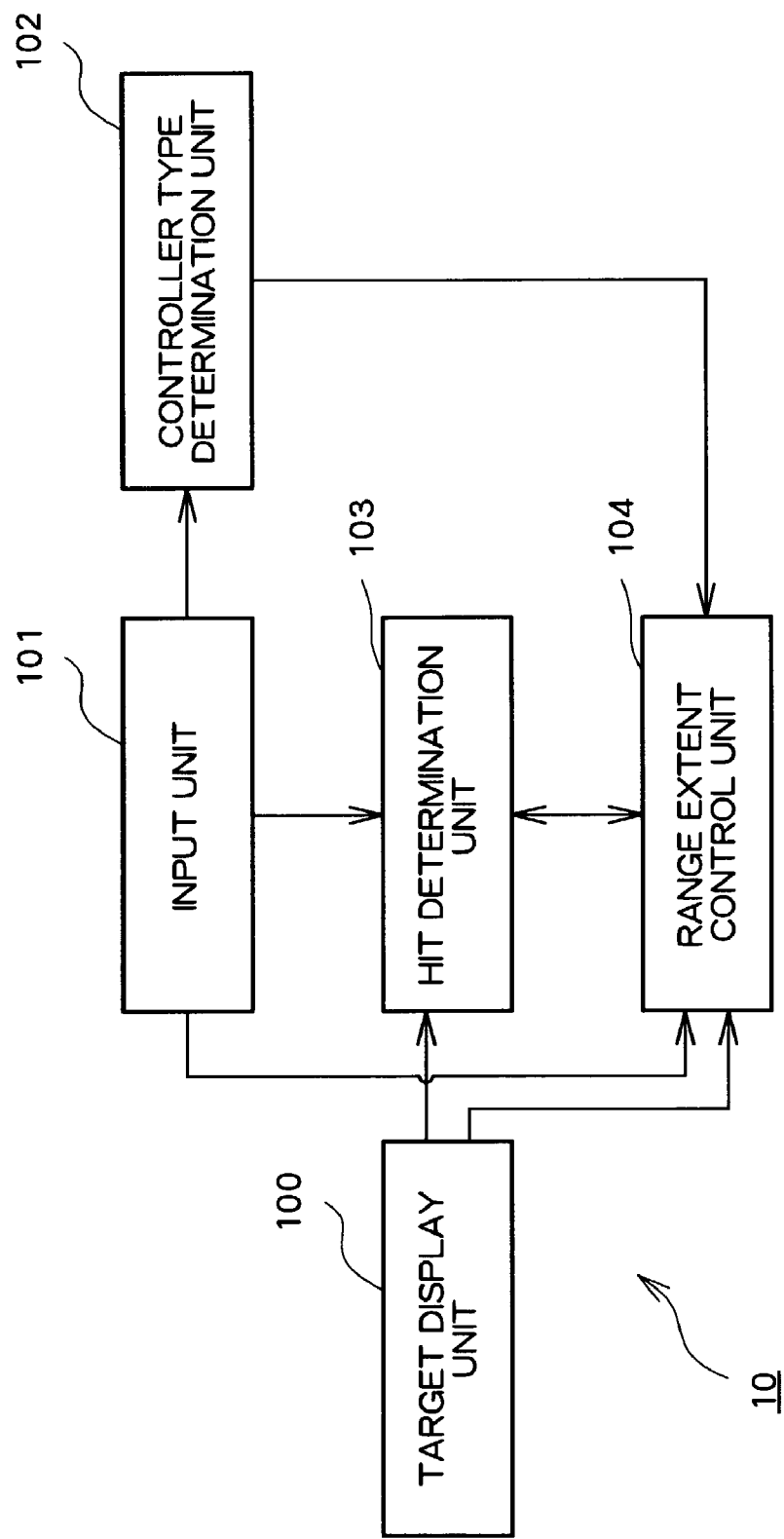
FIG. 8 is a functional block diagram illustrating the relation between functions implemented by the gun shooting game device according to the embodiment of the present invention.

Functions of the gun shooting game device 10 will next be described. FIG. 8 is a block diagram mainly illustrating functions corresponding to the present invention among those implemented by the gun shooting game device 10. The functions illustrated in this figure are implemented by the home-use game machine 46 executing the game program stored in the DVD 25. As illustrated, the functions implemented by the gun shooting game device 10 include a target display unit 100, an input unit 101, a controller type determination unit 102, a hit determination unit 103, and a range extent control unit 104.

The target display unit 100 includes the monitor 18, and displays a target (enemy game character) on the game screen. The target display unit 100 also supplies the position of the target (position coordinates in the three-dimensional game space) to the hit determination unit 103. The input unit 101, which includes one or more of the all-purpose controller 47, the gun controller 48, and the mouse 41, provides bullet firing direction data (position coordinates on the display screen of the home-use TV receiver 40).

The controller type determination unit 102 determines the type of the controller being connected to the home-use game machine 46 and used for data entry. More specifically, the all-purpose controller 47, the gun controller 48, and the mouse 41 are designed to supply a controller ID for identifying its type to the input unit 101 (home-use game machine 46), and based on this controller ID the controller type is determined.

It should be noted that the priority assigned to the all-purpose controller 47, the mouse 41, and the gun controller 48 increases in this order, and data entry from the controller with a higher priority is effective. By way of example, when the mouse 41 and the gun controller 48 are connected to the home-use game machine 46, data entry from the mouse 41 is ignored. The controller type determination unit 102 regards the gun controller 48 as the currently used controller. The determination result is supplied to the range extent control unit 104.

The hit determination unit 103 determines whether or not the bullet has hit the target based on the data supplied from the input unit 101 and the position coordinates of the target (enemy game character) supplied from the target display unit 100. The range extent control unit 104 controls the extent of a range of data supplied from the controller where the bullet is determined as hitting the target based on the controller type. For example, the unit 104 controls such that among input data, the range of coordinates where a bullet is consequently determined as hitting the target increases in the order of when the currently used controller is the mouse 41, the gun controller 48, and the all-purpose controller 47. In this example, the mouse 41 is the controller required operation with the highest accuracy, while the all-purpose controller 47 is the controller with which a bullet can hit the target with the lowest accuracy operation.

More specifically, the range extent control unit 104 calculates a trajectory based on the data input from the controller, and corrects the trajectory based on the position coordinates of the target. The unit also controls the amount of correcting the trajectory based on the controller type.

Figure 9:
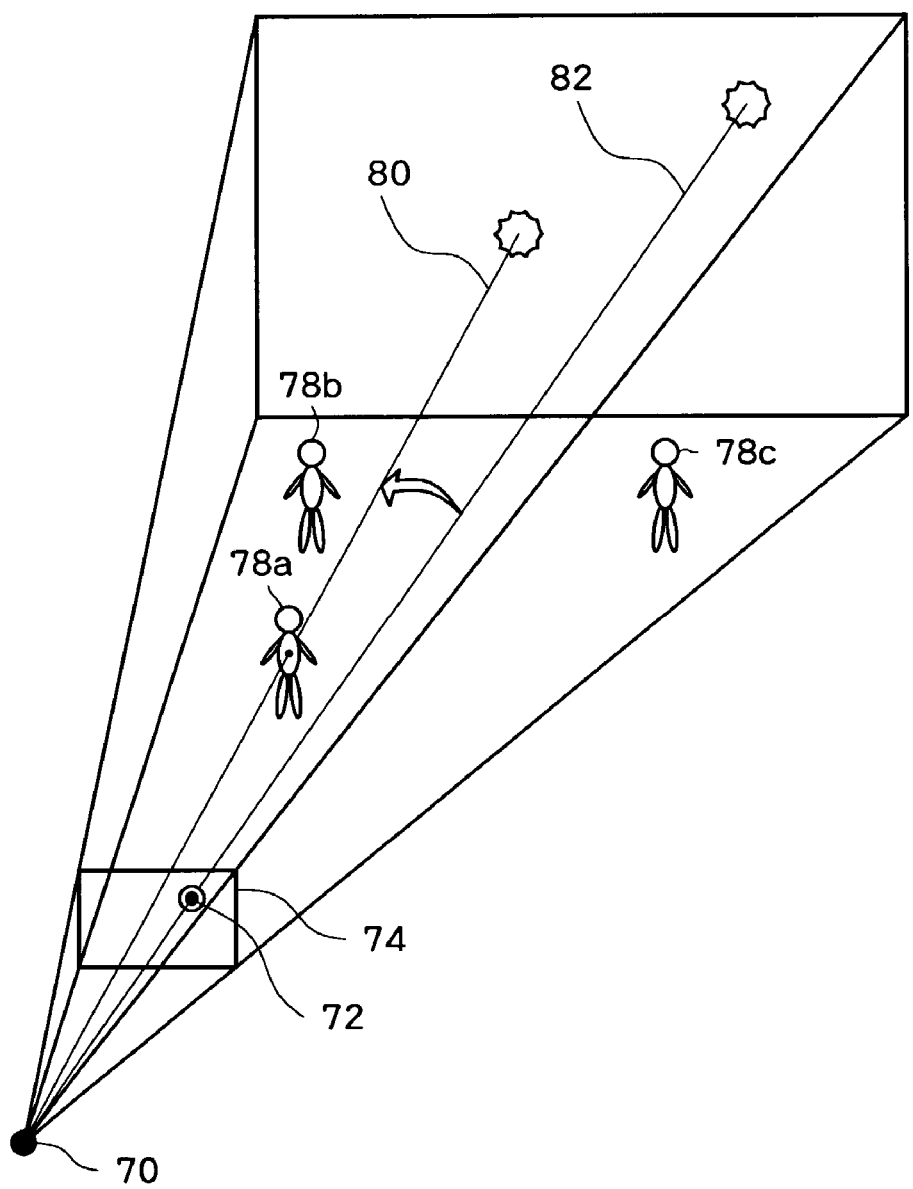
FIGS. 9 and 10 illustrate a concept for explaining a process performed by a range extent control unit.

FIG. 9 is a view for explaining a process performed by the range extent control unit 104. As described above, in the present gun shooting game device 10, a three-dimensional game space is virtually built in the main memory 26, and a viewpoint 70 is disposed therein. In the three-dimensional game space, enemy game characters 78a–78c are also disposed as targets. The enemy game characters 78a–78c and the like are projected onto a screen plane 74 disposed in front of the viewpoint 70 in the three-dimensional game space, and the projected image is displayed on the monitor 18 (home-use TV receiver 40). At this time, arbitrary position coordinates (two-dimensional coordinates) on the screen plane 74 are input by the all-purpose controller 47, the mouse 41, or the gun controller 48. When a bullet is fired, i.e. when the group of buttons 64 of the all-purpose controller 47 is depressed, when the left button 56 of the mouse 41 is depressed, or when the trigger 54 of the gun controller 48 is pulled, a straight line connecting the viewpoint 70 and the input coordinates 72 is obtained as a temporary trajectory 82. The input coordinates 72 are the coordinates of a position on the screen plane 74 pointed by the gun controller 48, or where a cursor is displayed, when the bullet is fired.

The distance between the thus calculated temporary trajectory 82 and each of the enemy game characters 78a–78c is calculated. The distance between the temporary trajectory 82 and each of the enemy game characters 78a–78c can be acquired by, for example, calculating the distance between the straight line representing the temporary trajectory 82 and a representative point set for each of the enemy game characters 78a–78c. When any of the enemy game characters 78a–78c is located in a predetermined distance range from the temporary trajectory 82, the character positioned closest to the temporary trajectory 82 is selected. In the illustrated example, the enemy game character 78a is selected as the enemy game character closest to the temporary trajectory 82. The straight line connecting the representative point of the enemy game character closest to the temporary trajectory 82 and the viewpoint 70 is then calculated as an ideal trajectory 80.

Figure 10:
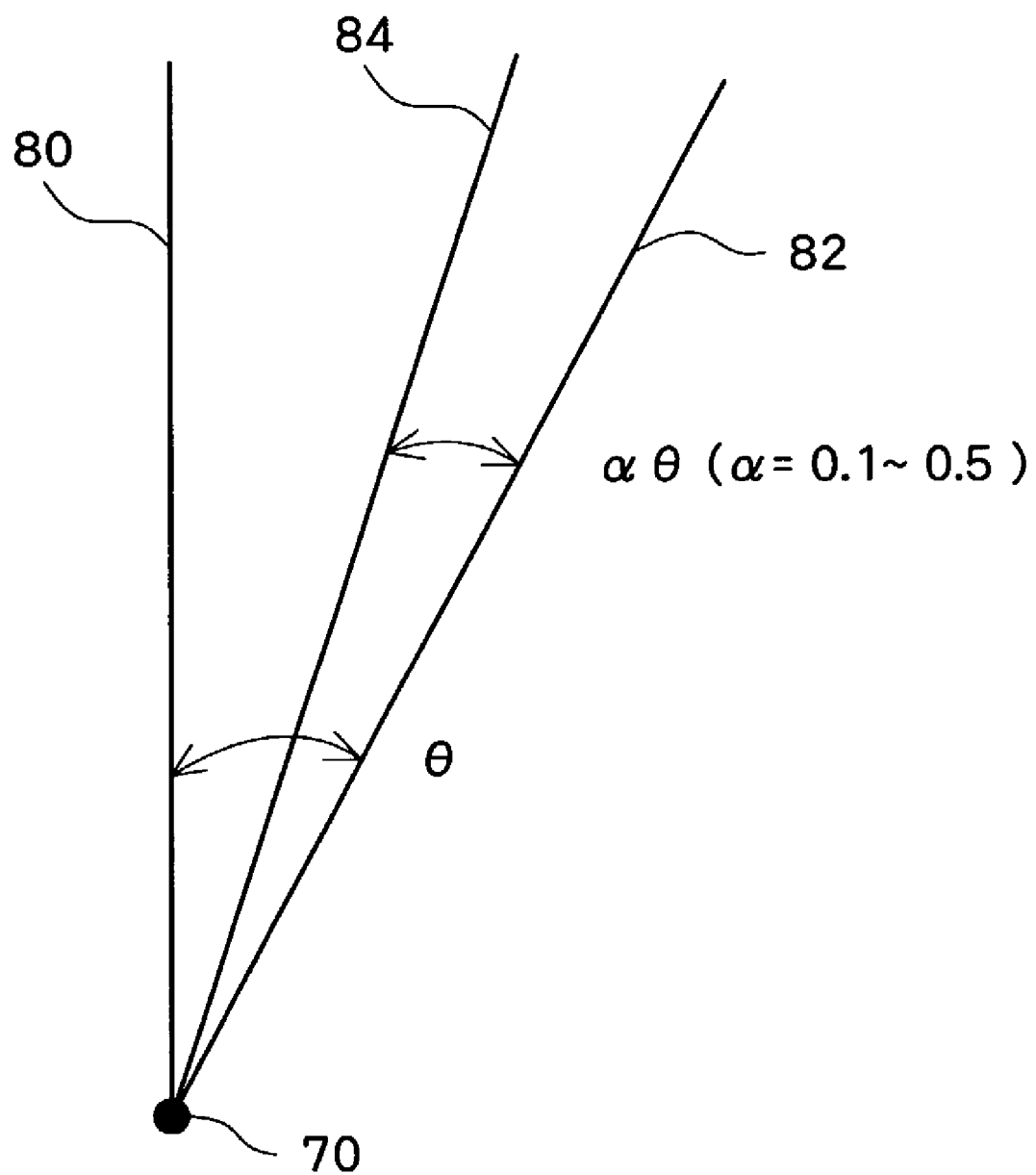

As illustrated in FIG. 10, a corrected temporary trajectory 84 is then obtained by shifting the temporary trajectory 82 closer to the ideal trajectory 80. By way of example, when the angle formed by the temporary trajectory 82 and the ideal trajectory 80 is 0, the corrected temporary trajectory 84 is established by inclining the temporary trajectory 82 by $\alpha\theta$ (wherein $\alpha$ is, for example, 0.1 to 0.5). Thus, the angle between the corrected temporary trajectory 84 and the ideal trajectory 80 equal to $(1-\alpha)\theta$ is obtained. Note that the value of the coefficient $\alpha$ is set in accordance with the controller type. For example, when the currently used controller is the mouse 41, the coefficient $\alpha$ is set at 0.1. The coefficient $\alpha$ is set at 0.3 and 0.5 for the gun controller 48 and the all-purpose controller 47, respectively. The bullet firing direction in the three-dimensional game space is then calculated based on the corrected temporary trajectory 84, and in this direction, i.e. in the direction of the corrected temporary trajectory 84, the bullet is virtually fired at a predetermined initial speed.

Determination of whether or not the bullet hit the enemy game character is made using a well-known technique. More specifically, a hit determination area (not displayed on the game screen) positioned and sized substantially the same as the enemy game character is disposed in the three-dimensional game space, and determination is made at predetermined time intervals as to interference between the hit determination area and the trajectory. When the trajectory extends to contact the hit determination area, a hit process is performed. The hit process includes a process for producing audio and visual effects, such as collapsing an enemy game character, updating the game score, or the like.

Figure 11:
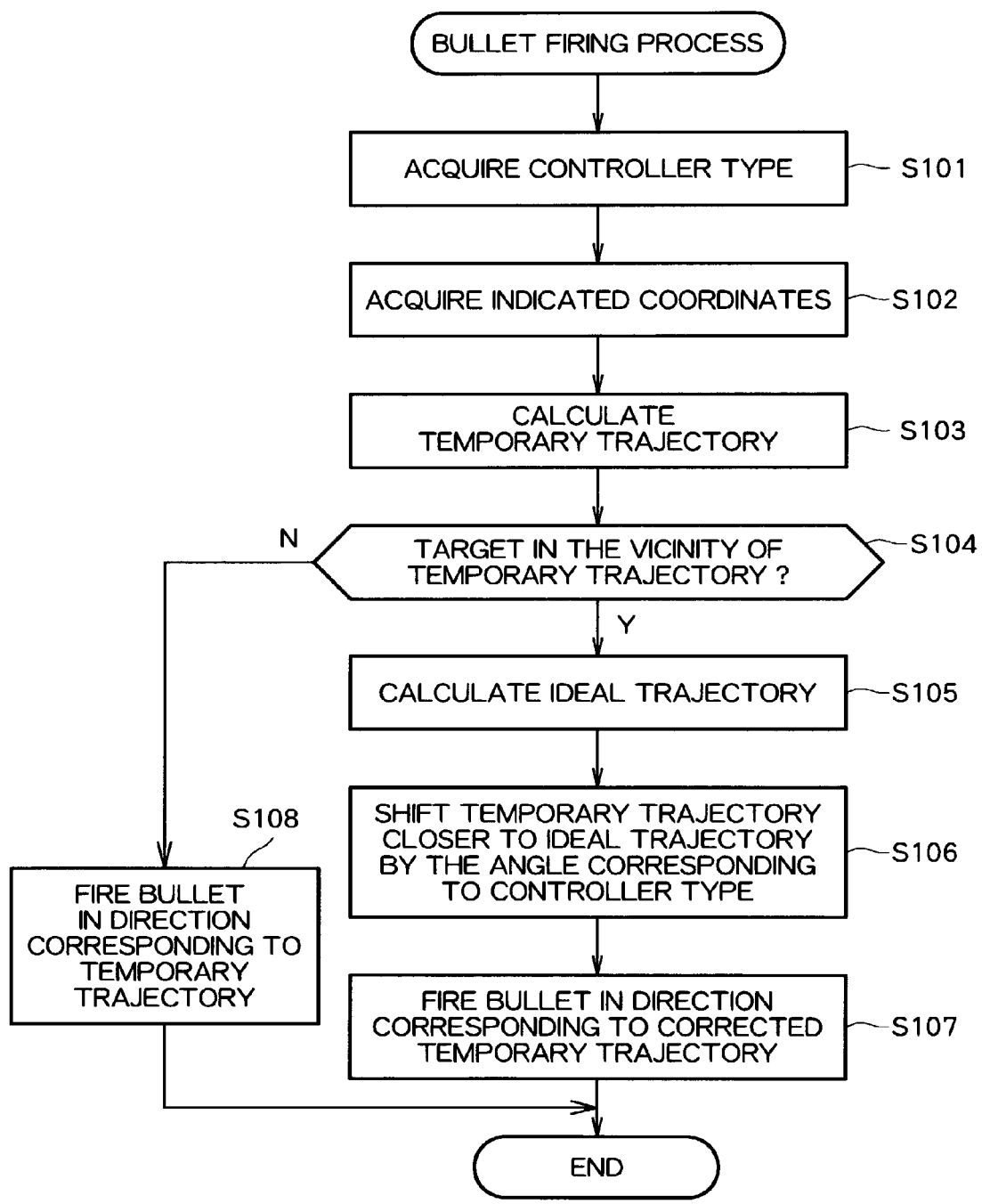
FIG. 11 is a flowchart for explaining a process performed by the range extent control unit.

FIG. 11 is a flowchart of a bullet firing process performed by the gun shooting game device 10. This bullet firing process is performed when a bullet is fired, i.e. when the group of buttons 64 of the all-purpose controller 47 is depressed, when the left button 56 of the mouse 41 is depressed, or when the trigger 54 of the gun controller 48 is pulled. The controller type determination unit 102 first acquires the controller type (S101). The controller type may be determined in advance, such as at the beginning of the game, or at the time of firing a bullet. The input unit 101 then acquires the input coordinates 72 supplied by the controller (S102). The range extent control unit 104 converts the coordinates supplied by the controller (screen coordinate system) into position coordinates in the three-dimensional game space, and calculates the temporary trajectory 82 based on the coordinates 72 and the coordinates of the viewpoint 70 (S103). The distance between the temporary trajectory 82 and each enemy game character (target) is obtained to determine whether or not the enemy game character is disposed in the vicinity of the temporary trajectory 82 (S104). If the enemy game character is not disposed in the vicinity of the temporary trajectory 82, a bullet is fired in the direction of the temporary trajectory (S108). The hit determination unit 103 thus determines whether or not a bullet fired in the three-dimensional game space hits each enemy game character.

On the other hand, if the enemy game character is disposed in the vicinity of the temporary trajectory, the range extent control unit 104 calculates as the ideal trajectory 80 the straight line connecting the viewpoint 70 and the representative point set for the enemy game character closest to the temporary trajectory 82 (the enemy game character 78a in the example of FIG. 9) (S105). The temporary trajectory 82 is shifted toward the ideal trajectory 80, thereby obtaining the corrected temporary trajectory 84 (S106). For this processing, the angle for shifting the temporary trajectory 82 is set by the range extent control unit 104 in accordance with the controller type. A bullet is then fired in the direction corresponding to the corrected temporary trajectory 84 (S107). The hit determination unit 103 thus determines whether or not the bullet fired in the three-dimensional game space hits each enemy game character.

As described above, according to the present gun shooting game device 10, the type of the controller connected to the home-use game machine 46 and used for providing operation directions is determined, and the range of the input data (two-dimensional coordinates) where a bullet hits a target (enemy game character) is varied in accordance with the determination result, thereby making it possible to change the difficulty level for hitting a target with a bullet corresponding to the controller type. As a result, even when a gun shooting game allowing selective use of controllers of multiple types is implemented, the effects of the controller type on the game can be minimized.

It should be noted that the present invention is not limited to the embodiments described above.

Figure 12A:
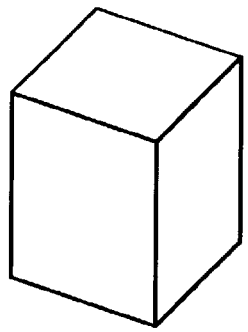
FIGS. 12A–12C illustrate examples of hit determination areas.
Figure 12B:
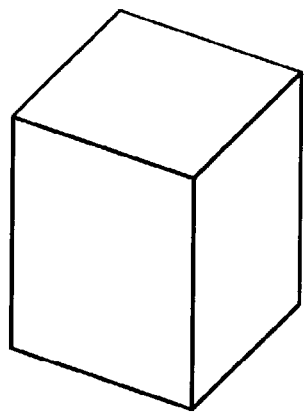
Figure 12C:
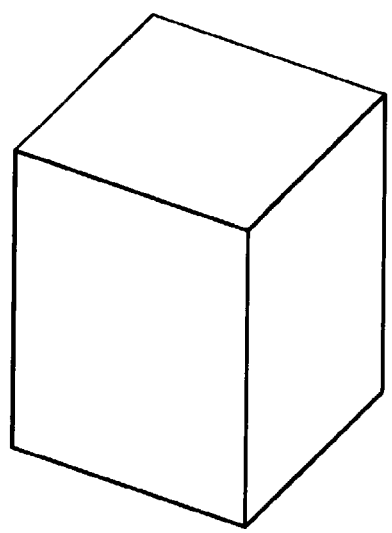

Byway of example, as illustrated in FIGS. 12A–12C, a plurality of hit determination areas differently sized for a single target (such as an enemy game character) may be provided so that any one of the areas is actually used for the hit determination process in accordance with the controller type. In this manner as well, the range of input data where a bullet hits a target (enemy game character) can be varied in accordance with the controller type, whereby and so the difficulty level for hitting a target with a bullet can be changed corresponding to the controller type.

What is claimed is:

1. A gun shooting game device allowing selective use of one or more types of controller among multiple types of controller, comprising:

target display means for displaying a target;

type determination means for determining a type of a currently used controller;

hit determination means for determining whether or not a bullet has hit said target based on data supplied by said currently used controller; and range extent control means for controlling an extent of a range of data supplied by said controller where said bullet is determined as hitting said target based on the type of said currently used controller.

2. A gun shooting game device according to claim 1, wherein said range extent control means includes trajectory information calculation means for calculating trajectory information on said bullet based on the data supplied from said currently used controller, trajectory information correction means for correcting said trajectory information based on a position of said target, and correction amount control means for controlling an amount of correction made by said trajectory information correction means based on the type of said currently used controller.

3. A gun shooting game device according to claim 1, wherein said hit determination means determines whether or not said bullet has hit said target based also on a positional relationship between said bullet and an invisible hit area moved in accordance with said target, and said range extent control means controls the extent of said hit area based on the type of said currently used controller.

4. A method of controlling a computer allowing selective use of one or more types of controller among multiple types of controller, comprising:

a target display step for displaying a target;

a type determination step for determining a type of a currently used controller;

a hit determination step for determining whether or not a bullet has hit said target based on data supplied by said currently used controller; and a range extent control step for controlling an extent of a range of data supplied by said controller where said bullet is determined as hitting said target based on the type of said currently used controller.

5. A program product comprising a storage medium storing a computer program for controlling a computer to function as a gun shooting game device allowing selective use of one or more types of controller among multiple types of controller, said program causing said computer to function as:

target display means for displaying a target;

type determination means for determining a type of a currently used controller;

hit determination means for determining whether or not a bullet has hit said target based on data supplied by said currently used controller; and range extent control means for controlling an extent of a range of data supplied by said controller where said bullet is determined as hitting said target based on the type of said currently used controller.

6. A program product comprising a storage medium storing a computer program for controlling computer to function as a gun shooting game device allowing selective use of one or more types of controller among multiple types of controller, said program containing the steps of:

displaying a target;

determining a type of a currently used controller;

determining whether or not a bullet has hit said target based on data supplied by said currently used controller; and controlling an extent of a range of data supplied by said controller where said bullet is determined as hitting said target based on the type of said currently used controller.

* * * * *